Patented May 7, 1946

2,399,882

UNITED STATES PATENT OFFICE 2,399,882

OLEFIN CONCENTRATION

Charles E. Morrell, Westfield, James K. Small, Union, and James H. McAteer, Cranford, N. J., assignors to Standard Oil Development Company, a corporation of Delaware No Drawing. Application November 3, 1944,
Serial No. 561,842

13 Claims. (Cl. 260—681.5)

This invention relates to improvements in processes for concentrating olefins and relates particularly to improvements in processes where cuprous salt solutions are used as extraction agents in the separation and concentration of olefins and diolefins.

Cuprous salt solutions, especially those containing ammonia, for example one containing 2 to 5 mols cuprous copper, 10.5 to 12 mols ammonia and 4 mols of acetic acid and having a pH value of 10.5 to 12.5 have been extensively developed for concentrating olefins and diolefins, for example butadiene from hydrocarbon mixtures. Cracked petroleum hydrocarbons contain crude butadiene and also small but varying amounts of acetylenic materials having the following boiling points:

| | °F. |
|---|---|
| Methyl acetylene | −9.8 |
| Vinyl acetylene | 41.0 |
| Ethyl acetylene | 47.7 |
| Dimethyl acetylene | 80.4 |
| Butadiene | 24.06 |

The total acetylene content of butadiene-containing $C_4$ fractions varies as to the process and feed stock used in the preparation of the said hydrocarbon fraction. Steam-cracked stocks produced at temperatures up to about 1250° F. usually contain less than about 0.1 weight per cent (1000 parts per million) of acetylenes in the $C_4$ cut. Catalytic dehydrogenation of butenes in normal adiabatic operation also produces relatively low acetylene $C_4$ cuts. Cracking at higher temperatures up to 1400° F. with steam or air increases the acetylenes to about 0.25 to 1.65%, cracking with air apparently giving the larger increase. The use of still higher temperatures of about 1400–1800° F. in regenerative furnaces produces a $C_4$ cut containing from 2 to 5% acetylenes.

In the concentration of butadiene it is desirable to remove these acetylenes in such a manner that they are not present in the purified butadiene but due to boiling points only methyl and dimethyl acetylene can be separated sufficiently by distillation. The dimethyl acetylene contains no acidic hydrogen and does not form copper acetylides. Vinyl and ethyl acetylene together with butadiene are readily removed from the hydrocarbon mixture by the use of a copper solution. One procedure which is in common practice for preventing these acetylenes from contaminating the butadiene product is to heat the solution under appropriate conditions (preferably after desorption of butadiene) to polymerize the acetylenes dissolved therein. Although the reaction is quite complex, and may involve also copolymerization and reaction with components of the copper solution, the process is referred to herein for purposes of simplicity as a "polymerization" and the products as polymerization products. The polymerization products from such a process are quite varied in nature. Some of the products are liquids which are readily removed from the copper solution by settling or by washing with an appropriate solvent such as hydrocarbon liquids. Liquid polymers of this type predominate when ethyl acetylene is the main acetylenic constituent of the crude butadiene. When vinyl acetylene is present in large amounts, some plastic or semi-solid materials are also formed. These may be removed by filtration.

It has been found, however, that in addition to the above types of products some of the products of acetylene polymerization are quite soluble in water, therefore also in the aqueous copper solution, and are not readily extracted with hydrocarbon solvents. They are not removed from the solution by ordinary filtration. These soluble products have not been too well identified since they appear to be a rather complex mixture of compounds some of which contain oxygen, nitrogen, carbon and hydrogen. At least a portion of these soluble products are highly objectionable in the butadiene extraction process since they are surface-active materials which tend to promote foaming of the solution, when contacted with a gas, and emulsion formation when the solution is contacted with a liquid hydrocarbon. This tendency to produce foaming and emulsification in the extraction systems is at least in part believed due to the fact that these materials greatly lower the interfacial tension of the solution with respect to hydrocarbons.

According to this invention it has been found that these surface-active materials can be removed from the used aqueous copper solution, and the foaming and emulsification tendencies of the solution thereby decreased, by contacting the solution with a variety of finely divided, insoluble materials, especially those which are known to possess high adsorption capacities. These materials include the natural and synthetic silicates of metals of groups II and III, the diatomaceous earths, the charcoals, and the like. Especially useful in this connection are magnesium silicates, aluminum silicates, and activated carbon. Ion exchange adsorptive substances, both organic resins such as the "amberlites" and inorganic agents such as the zeolites, may also be used. Commercial grades of these materials such as Magnesol (a magnesium silicate) and Super Filtrol (an aluminum silicate) are beneficial. Activated Alumina and silica gel are inferior to the above-mentioned preferred substances.

The effect of adsorbents on the surface tension of a used solution is illustrated in the following example:

EXAMPLE I

Portions of a solution of cuprous ammonium acetate which had been used in the concentration of butadiene from a highly cracked petroleum $C_4$ fraction containing about 2.5% acetylenes, and which had developed serious foaming and emulsifying characteristics, were shaken at room temperature with ½ volume of a powdered adsorbent, centrifuged to remove the adsorbent, and then tested for interfacial tension against a paraffinic oil at 25° C. in a du Nuoy interfacial tensiometer, with the following results:

| Solution | Solid adsorbent | Interfacial tension, dynes/cm. |
|---|---|---|
| Fresh copper solution | None | 21.8 |
| Used copper solution | do | 12.2 |
| Do | "Magnesol" | 20.0 |
| Do | "Super Filtrol" | 19.5 |
| Do | Activated charcoal | 17.6 |
| Do | "Amberlite" (base exchange) | 15.0 |
| Do | "Amberlite" (anion exchange) | 15.1 |
| Do | Activated Alumina | 13.9 |
| Do | "Super Hyflo" | 13.5 |
| Do | Attapulgus clay | 12.7 |

The solution may be contacted with these materials in a number of ways. One of these consists of slurrying the solid contact agent in this solution, which may be either hot or cold, preferably after the butadiene has been desorbed and either before or after the copper solution insoluble polymers have been separated, and subsequently passing the slurry through a filter to remove the solid material. Alternatively, the solid treating agent may be used as a precoat on the filter and the solution simply passed through this filter. In another type of procedure the contacting agent in pill or lump form may be placed in a tower on supporting grids and the solution circulated through this tower. Extremely small amounts of the solid adsorbent can produce marked effects in reducing the emulsification and foaming tendencies of the used solutions, as indicated in the examples below.

After a certain period of time the solid agent becomes spent and ineffective due to saturation of its surface with the adsorbed surface active material. Before this condition is reached fresh contact agent should be added to the extraction system. The contact agent may be regenerated in the following manner: It is first washed with aqueous ammonia to remove the copper retained by the agent and then revivified for further use by any of the following methods.

(1) Subjection to the action of high temperature steam.

(2) Burning of the material to regenerate it in the same manner as clay used in lubricating oil treatment is regenerated.

The following example shows the effectiveness of one of these contact agents, namely, Magnesol when used in operation.

EXAMPLE II

A test has been devised to measure the tendency of the copper solvent to foam when a gas is passed through it. The test consists in passing nitrogen gas through a wet test meter, then through a gas scrubbing bottle containing aqueous ammonia of proper concentration to provide the same partial pressure of ammonia as that over the solution to be tested. The gas then flows through a rotameter and finally into a 500 cc. graduated cylinder containing 75 cc. of the copper solution to be tested. The cylinder diameter is 2 inches. The 7-mm. glass tubing carrying nitrogen gas into the copper solution extends 1 inch below the surface of the solution and has a ½-inch fritted glass tip. Nitrogen is passed through the solution at a rate of 750 cc. per minute for one minute. The height to which the solution foams in the cylinder and the length of time required for the foam to break are observed. Tests are carried out at room temperature, 32° F. and 110° F. Used solution from a plant operating on a $C_4$ fraction containing 2.5% acetylenes, foamed to the top of the graduated cylinder in less than a minute, and requires 5 minutes to break. After treating the same solution with Magnesol and removing the Magnesol by filtration, the solution foams to only ½ the height of the cylinder, and the foam completely breaks in 30 seconds.

Other examples of the effectiveness of Magnesol and other treating agents are as follows:

EXAMPLE III

Samples of used copper solution from a pilot plant extracting butadiene from a cracked petroleum $C_4$ fraction containing 0.28% acetylenes were subjected to the following emulsion test: 10 cc. of the copper solution were mixed with 5 cc. of paraffinic naphtha (both at 15° F.) and shaken vigorously for 30 seconds, then allowed to stand at 15° F. for a maximum time of 5 minutes. The time was observed at which the emulsion was completely broken. When this did not occur in 5 minutes, the per cent of oil layer separated at that time was measured. Solution circulation in the plant was maintained at 50 gallons per hour. The total solution stream was desorbed of butadiene at about 170° F. ($\pm 10°$ F.) then passed through a soaking drum at 180° F. for 40 minutes residence time, then passed through a filter (which was by-passed for part of the run) then through coolers, then scrubbed with liquid butenes to remove oily polymers, and then recycled to the absorber and stripper tower, through which it was passed countercurrent to the $C_4$ fraction and to recycled butadiene, respectively, both hydrocarbon streams being maintained in liquid phase in the tower. The results of emulsion tests on solution samples taken at the desorber inlet, and the nature of the filtration, are given in the following table:

*Emulsion test*

| Filter precoat | Hour | Time, min./% oil separated |
|---|---|---|
| 900 gm. Filter Cel | 0–116 | |
|  | 70 | 20 |
|  | 95 | 17 |
|  | 120 | 20 |
| No filter | 116–262 | |
|  | 165 | 20 |
|  | 215 | 34 |
|  | 240 | 50 |
| 450 gms. Magnesol | 262–271 | |
| 450 gms. Filter Cel | 262 | 17 |
| Do | 271–287 | |
|  | 285 | 1.5 |
| 450 gms. Filter Cel, fresh filter each 24 hours | 287–360 | |
|  | 310 | 1.5 |
|  | 357 | 1.5 |

EXAMPLE IV

In another pilot plant run to extract butadiene from a cracked petroleum C4 fraction containing 1.8% acetylenes, in which the absorber and stripper were operated with the hydrocarbons in the vapor phase, and the circulation of the solution was the same as described in Example III, it was observed that filtration of the solution through a Magnesol precoat substantially reduced the foaming properties of the solution, and that when the filter was by-passed the solution increased greatly in foaming properties. The variation in foaming characteristics with the use of a Magnesol precoated filter is indicated in the following table:

*Foam test at 32° F.*

| Filter precoat | Hour | Cc. foam × breaking-time in sec. / 1000 |
|---|---|---|
| 380 gms. Magnesol | 195 | 76 |
| 380 gms. Filter Cel. changed each 8 hrs. | 240 | 68 |
| | 262 | 60 |
| | 285 | 60 |
| | 305 | 30 |
| | 329 | 32 |
| Filter by-passed from hour 329 | 358 | 60 |
| | 375 | 140 |

EXAMPLE V

The effect of varying the amount of Magnesol in batch treatments on the foaming properties of a used cuprous ammonium acetate solution, such as that described in the above examples when no filter was used in the plant, is shown in the following table:

| Gm. Magnesol per 300 cc. solvent | Temp., °F. | Foam, cc. | Cc. foam × breaking time in sec. / 1000 |
|---|---|---|---|
| Blank (0.0) | 96 | 600+ | 144+ |
| 0.9 | 97 | 525 | 34 |
| 1.8 | 97 | 460 | 23 |
| 3.6 | 97 | 410 | 12 |
| 7.2 | 95 | 375 | 9 |

Other additives, used in proportions of 3.6 gms./300 cc. of the same used copper solution, gave the following results:

| Additive | Temp., °F. | Foam, cc. | Cc. foam × break time in sec. / 1000 |
|---|---|---|---|
| Blank | 88 | 600+ | 144+ |
| Johns Manville "Sorbo Al" | 89 | 375 | 15 |
| Dicalite "speed flow" | 88 | 425 | 17 |
| "–4200" | 88 | 385 | 17 |
| Johns Manville "Celite" | 89 | 325 | 11 |

The copper solution used in the above examples had the following approximate analysis:

|  | Mols per liter |
|---|---|
| Cuprous copper | 3.0 |
| Cupric copper | 0.3 |
| Acetate | 4.0 |
| Ammonia | 11.0 | although it will be understood that this invention is not limited to the treatment of this solution but is applicable with all cuprous solutions having the capacity to extract olefins or diolefins from more saturated hydrocarbons.

We claim:

1. The improvement in the separation of olefins from mixtures of hydrocarbons using a cuprous salt solution as the absorption medium which comprises treating the said mixture of hydrocarbons containing diolefins and acetylenes with a cuprous salt solution, separating the cuprous salt solution with the acetylenes and diolefin dissolved therein, heating the cuprous salt solution to separate the diolefin and to form polymers, treating the said cuprous salt solution containing the polymers with a solid material having high adsorption capacity, separating the solid material and continuing the use of the cuprous salt solution in the said separation of diolefins.

2. The improvement in the separation of olefins according to claim 1 in which the solid material used is a silicate of a metal of groups II and III.

3. The improvement in the separation of olefins according to claim 1 in which the solid material is a magnesium silicate.

4. The improvement in the separation of olefins according to claim 1 in which the solid material is an activated carbon.

5. The improvement in the separation of olefins according to claim 1 in which the solid material is of diatomaceous earth.

6. The improvement in the separation of diolefins from a mixture of hydrocarbons which comprises contacting the diolefins with an aqueous solution of 2–5 mols of cuprous copper, 10½ to 12 mols of ammonia and 4 mols of acetic acid, separating the aqueous solution of cuprous salt from unabsorbed hydrocarbon mixture, heating the separated aqueous cuprous salt solution to recover diolefins and form polymers of acetylenes, treating the aqueous cuprous salt solution with a finely divided insoluble solid adsorptive material, separating the finely divided insoluble adsorptive material from the aqueous solution of cuprous salt and recycling the aqueous solution of cuprous salt to absorb more diolefins.

7. The improvements in the separation of diolefins according to claim 6 in which the finely divided insoluble solid adsorptive material is a magnesium silicate.

8. The improvement in the separation of diolefins from a mixture of hydrocarbons which comprises contacting the diolefins with an aqueous solution of 2–5 mols of cuprous copper, 10½ to 12 mols of ammonia and 4 mols of acetic acid, separating the aqueous solution of cuprous salt from unabsorbed hydrocarbon mixture, heating the separated aqueous cuprous salt solution to recover diolefins and form polymers of acetylenes, filtering the aqueous cuprous salt solution through a filter coated with a finely divided insoluble solid adsorptive material.

9. The improvement in the separation of diolefins according to claim 8 in which the finely divided insoluble solid adsorptive material is a magnesium silicate.

10. The improvement in the separation of diolefins according to claim 6, in which the finely divided insoluble adsorptive material is an activated carbon.

11. The improvement in the separation of diolefins according to claim 8, in which the finely divided insoluble solid adsorptive material is an activated carbon.

12. The improvement in the separation of an olefin from a mixture of hydrocarbons containing acetylenes using a cuprous salt solution as an adsorption medium which comprises treating the mixture of hydrocarbons with the cuprous salt solution, separating the cuprous salt solution with acetylenes and an olefin absorbed therein from unabsorbed hydrocarbons of the mixture, desorbing the absorbed olefin for the separation of the olefin and polymerizing the absorbed acetylenes in the cuprous salt solution separated from the unabsorbed hydrocarbons of the mixture, contacting the thus-separated cuprous salt solution containing polymerized acetylenes with a solid material having high adsorption capacity, separating the cuprous salt solution from said solid material and continuing the use of the cuprous salt solution as an absorption medium for separation of an olefin.

13. The improvement in the separation of an olefin as described in claim 12, in which said separated cuprous salt solution, from which the absorbed olefin is desorbed and in which the acetylenes are polymerized, undergoes the contacting with, then the separating from, the solid material on circulating through a zone wherein the solid material is supported in lump form.

CHARLES E. MORRELL.
JAMES K. SMALL.
JAMES H. McATEER.